May 13, 1952     C. A. DUKE     2,596,382
NUTCRACKER

Filed March 14, 1950

Charles A. Duke
INVENTOR.

Patented May 13, 1952

2,596,382

UNITED STATES PATENT OFFICE 2,596,382

NUTCRACKER

Charles A. Duke, San Antonio, Tex.

Application March 14, 1950, Serial No. 149,592

1 Claim. (Cl. 146—13)

The present invention relates to nut crackers of the type used for halving the nut and then trimming the shell from each half of the nut.

Another object of the invention is to provide a nut cracker having the above mentioned object and wherein the means for accomplishing the object comprises a pair of levers pivotally mounted with respect to each other at a point intermediate their ends and providing jaw means and trimming edges at one end and handle means at the other end.

A further object of this invention is to provide means for limiting the pivotal movement of the levers and resilient means for urging the levers to open position.

This invention also has for its object to provide such means that are convenient in use, economical of manufacture, and relatively simple.

Various other objects and advantages will be apparent from the detailed description to follow.

Figure 1:
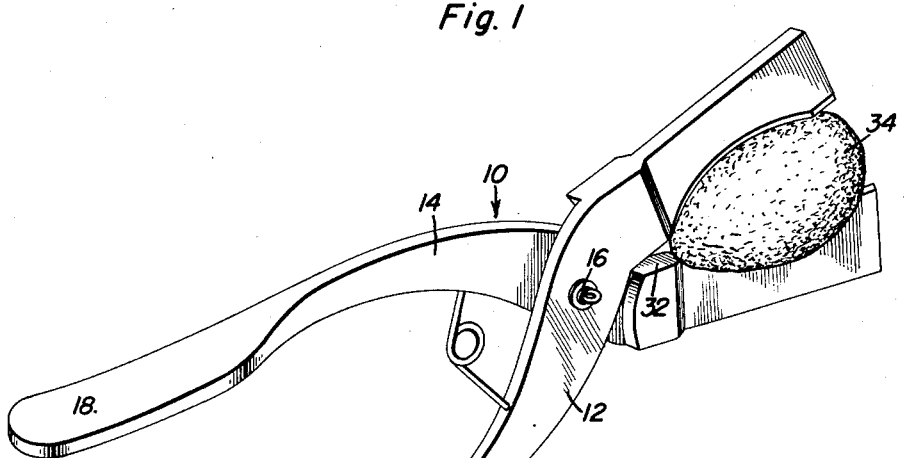
Figure 2:
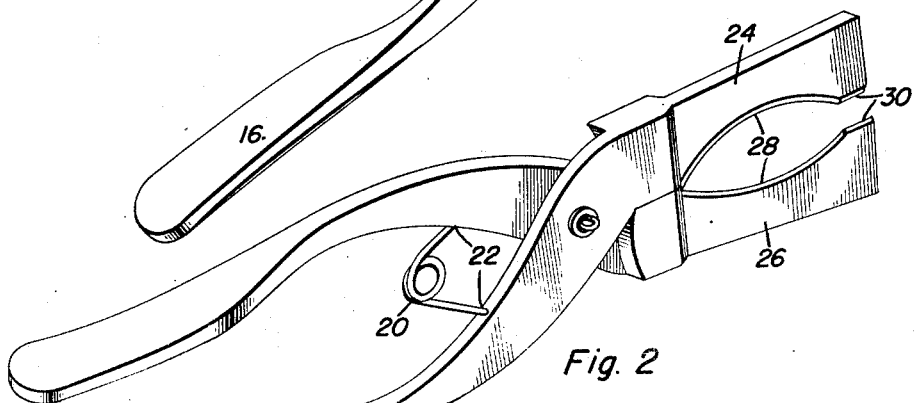
Figure 3:
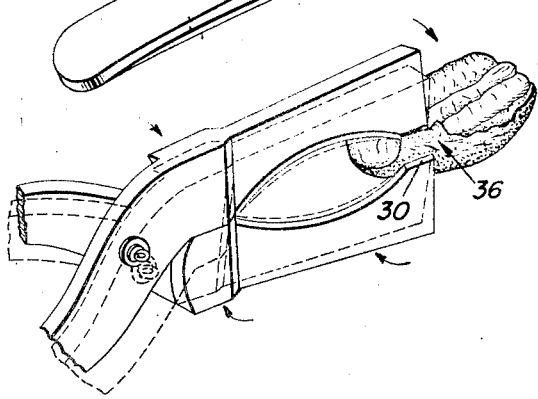

The best embodiment of my invention is illustrated in the accompanying drawings, in which:

Figure 1 is a perspective view of the nut cracker having a nut placed between the jaws in position for splitting;

Figure 2 is a perspective view of the nut cracker of Figure 1 showing the nut cracker with the jaws at their innermost position; and Figure 3 shows the jaw portions and limiting means at their innermost position with a halved nut having a portion of the shell between the trimming edges, the dotted lines of Figure 3 showing the nut cracker in rotated position with respect to the nut for trimming the shell from the halved nut.

Looking more particularly to the drawings, wherein like numerals designate like parts, the numeral 10 designates generally the nut cracker. The nut cracker 10 consists of a pair of pivotally mounted levers 12 and 14 being pivoted to each other by a pin 16 located substantially nearer the jaw ends than the handle ends of the levers. The handle 12 is provided with a flattened end portion 16 and the lever 14 has a flattened portion 18 which, with portion 16, form the handles of the nut cracker. As shown by the drawings, the flattened portions 16 and 18 have offset portions whereby the handles will be in radial alignment. Resilient means 20 is positioned between the handle members 12 and 14 with its ends 22 secured in the levers for resiliently urging the handles toward each other. At the ends opposite to the handles, the levers are provided with jaws 24 and 26 having arcuately curved sharpened edges 28 which engage the nut for splitting, and straight edges 30 being continuations of the arcuately curved edges 28 at their outer ends. The lever members 12 and 14 are provided with flattened portions 32 which engage each other when the levers reach a predetermined position. The flat portions 32 provide a limiting means whereby, when the nut cracker is in its normal resting position as shown in Figure 2, the straight edges 30 are radially spaced.

When the nut is to be split, the handle portions 16 and 18 are manually held and spread in opposition to the spring 20 to open the jaws 24 and 26. A nut 34 is placed between the arcuately curved sharpened edges 28 and the handle portions 16 and 18 are brought toward each other to split the nut in two. After the nut has been split and it is desired to trim the shell from the two halves, one-half of the nut is held in one hand and with the nut cracker held in the other hand, the portion of the shell to be trimmed is placed between the straight edges 30 as shown best in Figure 3. The nut cracker is then rotated with respect to the nut as shown by the arrows and dotted lines, causing the shell portion 36 to be snapped along the dotted line.

It will be noted that with the resilient means 20 normally urging the jaws to grip the nut 34, the likelihood of the nut 34 dropping from between the jaws 24 and 26 is materially reduced while the person cracking the nut is getting a firm grip on the handle portions 16 and 18. It will also be seen that a novel arrangement is provided for splitting the nut and for trimming it, whereby the meat therein is not broken up in the shelling operation.

Some changes may be made in the construction and arrangement of the parts of my device without departing from the real spirit and purpose of my invention, and it is my intention to cover by the claim any modified forms which may reasonably be included within its scope.

Having described the invention, what is claimed as new is:

A nut cracker comprising: a pair of levers pivotally mounted with respect to each other at a point intermediate their ends, jaw means on said levers for receiving the nut to be cracked, limiting means for limiting the pivoting movement in one direction, resilient means for urging said jaws in said one direction, and sharpened straight edges at the outer ends of said jaws radially and laterally spaced at their innermost position and adapted to trim the shell off a nut, said jaw means including arcuately curved sharp edges terminating in the sharpened straight edges at the outer ends of said jaws, said limiting means consisting of a flat surface on each of said levers at positions forming radially inward surface extensions from said curved edges and cooperatively engaging each other to maintain the straight edges in spaced relation.

CHARLES A. DUKE.

REFERENCES CITED

The following references are of record in the file of this patent:

UNITED STATES PATENTS

| Number | Name | Date |
| --- | --- | --- |
| 1,085,461 | Michaelis | Jan. 27, 1914 |
| 2,058,072 | Fiddyment | Oct. 20, 1936 |
| 2,090,341 | Burnham | Aug. 17, 1937 |

FOREIGN PATENTS

| Number | Country | Date |
| --- | --- | --- |
| 409,830 | Great Britain | Dec. 24, 1932 |